(12) United States Patent
Premkumar et al.

(10) Patent No.: US 12,194,857 B2
(45) Date of Patent: Jan. 14, 2025

(54) DRIVE DEVICE FOR ELECTRIC TRUCK

(71) Applicant: Daimler AG, Stuttgart (DE)

(72) Inventors: Karthikeyan Premkumar, Tamil Nadu (IN); Aydogan Cakmaz, Kanagawa (JP); Pradeep Kumar Thimmaiyan, Tamil Nadu (IN); Manish Saxena, Tamil Nadu (IN); Karthikeyan Suryanarayanan, Tamil Nadu (IN); Gopinath Murugan, Tamil Nadu (IN)

(73) Assignee: Daimler Truck AG, Leinfelden-Echterdingen (DE)

( * ) Notice: Subject to any disclaimer, the term of this patent is extended or adjusted under 35 U.S.C. 154(b) by 254 days.

(21) Appl. No.: 17/782,477

(22) PCT Filed: Dec. 8, 2020

(86) PCT No.: PCT/JP2020/045614
§ 371 (c)(1),
(2) Date: Jun. 3, 2022

(87) PCT Pub. No.: WO2021/153014
PCT Pub. Date: Aug. 5, 2021

(65) Prior Publication Data
US 2023/0001779 A1    Jan. 5, 2023

(30) Foreign Application Priority Data

Jan. 27, 2020 (JP) .................................. 2020-010655

(51) Int. Cl.
*B60K 1/02* (2006.01)
*B60G 11/27* (2006.01)
(Continued)

(52) U.S. Cl.
CPC ............ *B60K 7/0007* (2013.01); *B60G 11/27* (2013.01); *B60K 1/02* (2013.01); *B62D 7/14* (2013.01)

(58) Field of Classification Search
CPC ........ B60K 7/0007; B60K 1/02; B60G 11/27; B62D 7/01
(Continued)

(56) References Cited

U.S. PATENT DOCUMENTS 10,752,300 B2    8/2020  Milton et al.
2002/0175009 A1  11/2002 Kress
(Continued)

FOREIGN PATENT DOCUMENTS

CA    2 398 818 A1    7/2001
CA    3 024 311 A1   11/2017
(Continued)

OTHER PUBLICATIONS

Translation of DE-102015212574-A1 accessed at www.espacenet.com on Jun. 1, 2024. (Year: 2017).*
(Continued)

*Primary Examiner* — James A Shriver, II
*Assistant Examiner* — Hilary L Johns
(74) *Attorney, Agent, or Firm* — Crowell & Moring LLP

(57) ABSTRACT

A drive device for an electric truck includes drive unit housings provided to each of drive wheels on left and right sides of the electric truck, each of the drive unit housings integrally accommodating a motor that generates drive power, a reducer that reduces a rotation speed of the motor, and a final gear that is connected to the reducer and transfers the drive power of the motor to the drive wheel. The drive device further includes suspension parts one provided over the final gear in each of the drive unit housings, steering gear parts one being provided over each of the suspension parts,
(Continued)

pairs of hinge parts, and pairs of body-connecting parts, one of the pairs connecting each of the steering gear parts to a vehicle body of the electric truck through each of the pairs of hinge parts.

7 Claims, 8 Drawing Sheets

(51) Int. Cl.
*B60K 7/00* (2006.01)
*B62D 7/14* (2006.01)
(58) Field of Classification Search
USPC ....................................................... 180/65.51
See application file for complete search history.

(56) References Cited

U.S. PATENT DOCUMENTS

| | | | |
|---|---|---|---|
| 2012/0018983 | A1 | 1/2012 | Oriet |
| 2017/0320382 | A1 | 11/2017 | Milton et al. |
| 2018/0093706 | A1 | 4/2018 | Nguyen et al. |
| 2018/0264929 | A1 | 9/2018 | Tamura et al. |
| 2022/0410692 | A1* | 12/2022 | Premkumar ............ B60G 11/28 |
| 2022/0410693 | A1* | 12/2022 | Premkumar ............ B60K 1/00 |
| 2023/0001779 | A1* | 1/2023 | Premkumar ............ B60G 11/27 |

FOREIGN PATENT DOCUMENTS

| | | | |
|---|---|---|---|
| CN | 1418161 | A | 5/2003 |
| CN | 103038124 | A | 4/2013 |
| CN | 106394153 | A | 2/2017 |
| CN | 107989945 | A | 5/2018 |
| CN | 108081886 | A | 5/2018 |
| CN | 110582423 | A | 12/2019 |
| CN | 111002818 | A | 4/2020 |
| DE | 102015212574 | A1 * | 1/2017 |
| EP | 3 501 872 | A1 | 6/2019 |
| JP | 2002-193133 | A | 7/2002 |
| JP | 2013-124086 | A | 6/2013 |
| JP | 2019-26050 | A | 2/2019 |
| JP | 2019-515840 | A | 6/2019 |
| KR | 10-2019-0028379 | A | 3/2019 |
| WO | WO 01/53141 | A1 | 7/2001 |
| WO | WO 02/06111 | A1 | 1/2002 |
| WO | WO 2012/011921 | A1 | 1/2012 |
| WO | WO 2017/196778 | A1 | 11/2017 |
| WO | WO 2017/214686 | A1 | 12/2017 |
| WO | WO 2018/064746 | A1 | 4/2018 |

OTHER PUBLICATIONS

PCT/JP2020/045614, International Preliminary Report on Patentability (PCT/IB/373) and Written Opinion (PCT/ISA/237) dated Jul. 28, 2022 (Five (5) pages).
Chinese Office Action issued in Chinese application No. 202080094661.9 dated Jun. 21, 2023, with partial English translation (Twelve (12) pages).
English-language Extended European Search Report dated Jun. 21, 2023 (Seven (7) pages).
PCT/JP2020/045614, International Search Report dated Jan. 19, 2021 (Three (3) pages).

* cited by examiner

DRIVE DEVICE FOR ELECTRIC TRUCK

TECHNICAL FIELD

The present disclosure relate to a drive device for an electric truck.

BACKGROUND ART

In recent years, from the viewpoint of reducing the environmental load, in the field of commercial vehicles such as trucks, there has been developed an electric truck which does not have an internal combustion engine and is driven only by an electric motor (see Patent Literature 1). As a drive device used for such an electric truck, for example, as shown in Patent Literature 1, a drive device in which a driving motor and a reducer are integrally provided in a differential gear has been considered.

PRIOR ART REFERENCE

Patent Literature

[PATENT LITERATURE 1] Japanese Laid-open Patent Publication No. 2019-026050

SUMMARY OF INVENTION

Problems to be Solved by Invention

For commercial vehicles such as trucks, there is a market demand to improve the steering performance of vehicles by increasing the steering angle of wheels to 90° or more, preferably to about 180°. If such a steering angle can be realized, there is an advantage that the turning radius can be reduced, and if the steering of 180° is possible, the vehicle can be moved and parked in the left-right direction.

However, in an electric truck which is actually produced up to now, since a suspension device of a leaf spring type, a rigid axle, or the like is often employed, it is difficult to realize the steering angle described above. In addition, since the electric truck is required to have a higher torque than that of a passenger car, it is necessary to provide a speed reduction mechanism, which increases the size of the drive device. From this point of view as well, it is difficult to realize the steering angle described above.

An electric truck has a tendency of having larger vehicle-body vibration while traveling than a passenger car, and for this reason, a demand arises to improve drive feeling.

With the foregoing problems in view, it is an object of the present disclosure to provide a drive device for an electric truck having a steering performance of a steering angle of 0° to 180° while improving drive feeling.

Means to Solve the Problems

The present disclosure is made in order to solve at least part of the above problems and can be carried out in the following embodiment or application.

(1) A drive device for an electric truck of the present application example includes drive unit housings disposed on each of left and right sides of the electric truck, each of the drive unit housings integrally accommodating a motor that generates drive power, a reducer that reduces a rotation speed of the motor, and a final gear that is connected to the reducer and transfers the drive power of the motor to the drive wheel; suspension parts one provided over the final gear in each of the drive unit housings; steering gear parts one being provided over each of the suspension parts and being configured to be steerable the drive wheel; pairs of hinge parts, each pair disposed one to each of a vehicle front side and a vehicle rear side of each of the steering gear parts; and pairs of body-connecting parts, one of the pairs connecting each of the steering gear parts to a vehicle body of the electric truck through each of the pairs of hinge parts.

This configuration drives each individual drive wheel and steers each individual drive wheel, and consequently can achieve a steering angle in the range of 0° to 180°, which makes the turning radius small. Furthermore, the steering gear part is connected to the vehicle body through the pair of hinge parts and the pair of body-connecting parts, so that the drive feeling can be enhanced.

(2) In the drive device for the electric truck of the present application example, each of the suspension parts may be an air suspension including: an outer tube centered at a steering shaft of the drive wheel; and an inner tube being concentric with the outer tube, being slidable along an inner circumference face of the outer tube in an axis direction, and being incapable of relatively rotating with respect to the outer tube.

As such, serving the air suspension as the suspension part makes a configuration simpler as compared with serving a hydraulic suspension or an electromagnetic suspension as that.

(3) In the drive device for the electric truck of the present application example, an upper part of the outer tube may be linked to a lower part of the inner tube.

Linking the upper part and the lower part of the two tubes constituting the air suspension by, for example, a steering arm mechanism or a stabilizer mechanism restricts the outer tube and the inner tube to rotate relatively to each other but allows the outer tube and the inner tube to vertically move relatively to each other and further makes these movements smooth.

(4) In the drive device for the electric truck of the present application example, each of the steering gear parts may include a protrusion portion to be connected to the body-connecting parts and a tube portion being concentric with the steering shaft of the drive wheel; an upper portion of the outer tube may be concentric with the tube portion and is rotatably supported by the tube portion; a thrust plate that receives load of a vertical direction may be interposed between an inner circumference face of the tube portion and an outer circumference face of the outer tube.

With this configuration, the thrust plate interposed between the tube portion and the outer tube serves as a spacer, which avoids direct contact of the tube portion on the fixing side with the outer tube on the rotating side. Furthermore, since the thrust plate receives the load in the vertical direction, the drive feeling is further enhanced.

(5) In the drive device for the electric truck of the present application example, the steering gear part may further include a low frictional member being arranged at a point where the outer tube is brought into slidable contact with the thrust plate and reducing friction of the outer tube with the thrust plate.

This configuration makes the low frictional member possible to reduce the friction between the thrust plate and the outer tube.

(6) In the drive device for the electric truck of the present application example, each of the steering gear parts may be configured to be capable of steering the drive wheel up to 90° leftward and rightward on an assumption that a steering angle of the drive wheel under a state where the electric truck is traveling straight forward is 0°.

This configuration enhances the steering performance, which allows the truck to be moved and parked in a left-right direction, for example.

(7) In the drive device for the electric truck of the present application example, the drive device may be applied to the electric truck comprising a double-tire constituting two of the drive wheels; and the drive power of the motor may be transferred to the double-tire.

By adopting the double-tire as the above, the drive device can be also applied to a larger electric truck.

(8) In the drive device for the electric truck of the present application example, the final gear of the each of the drive unit housings may be included in a differential gear.

This structure distributes appropriate drive power to the double-tire, so that the steering performance can be enhanced.

Effects of Invention

The present disclosure makes it possible to provide a drive device for an electric truck having a steering performance of a steering angle of 0° to 180° while improving drive feeling.

DESCRIPTION OF EMBODIMENT(S)

A drive device for an electric truck according to an embodiment will now be described with reference to accompanying drawings. The following embodiment is merely example, so there is no intention to exclude various modifications and applications of techniques not explicitly described in the following embodiment. Each of the structures of the present embodiment can be variously modified without departing from the scope of the structure. The structures may be appropriately selected, omitted, or combined according to the requirement.

[1. Overall Configuration]

Figure 1:
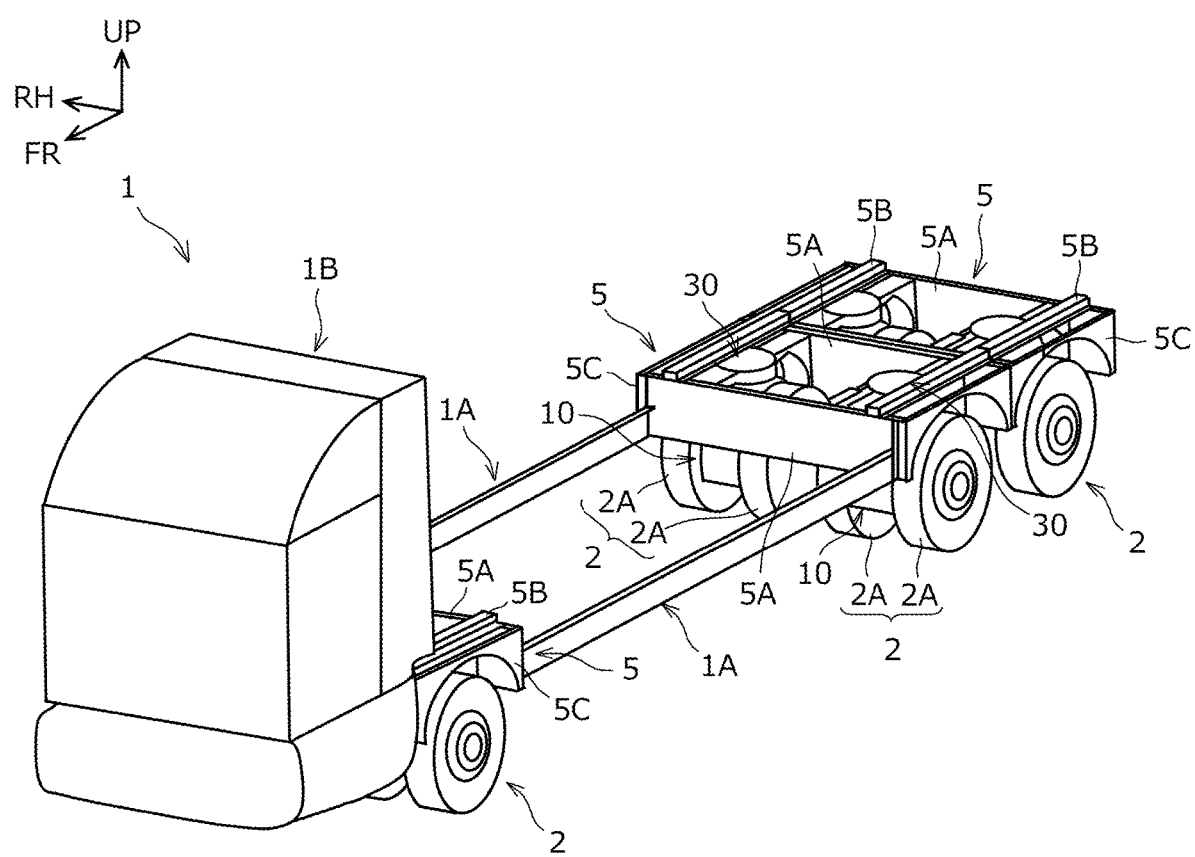
FIG. 1 is an overall perspective view of an electric truck to which a drive device according to an embodiment is applied.

As illustrated in FIG. 1, the drive device according to the present embodiment is applied to an electric truck 1 that travels only by the drive power of a motor 11 (see FIG. 3) without an internal combustion engine. In FIG. 1, the electric truck 1 (hereinafter simply referred to as the "truck 1") including a pair of left and right side frames 1A (also referred to as chassis frames) extending in the front-rear direction of the vehicle and a cab 1B disposed in the front part of the vehicle is illustrated, and the illustration of the body is omitted. In addition to the side frames 1A, a frame extending in the vehicle widthwise direction may be provided, or the side frames 1A may be omitted.

In the following description, the forward direction of the truck 1 will be referred to as the "front", and the opposite direction to the front will be referred to as the "rear". In addition, the left-right direction is determined with reference to the state of the truck 1 facing forward. The left-right direction is orthogonal to the front-rear direction of the vehicle. Hereinafter, the left-right direction is referred to as a "vehicle width direction", and the front-rear direction of the vehicle is simply referred to as a "front-rear direction".

Figure 2:
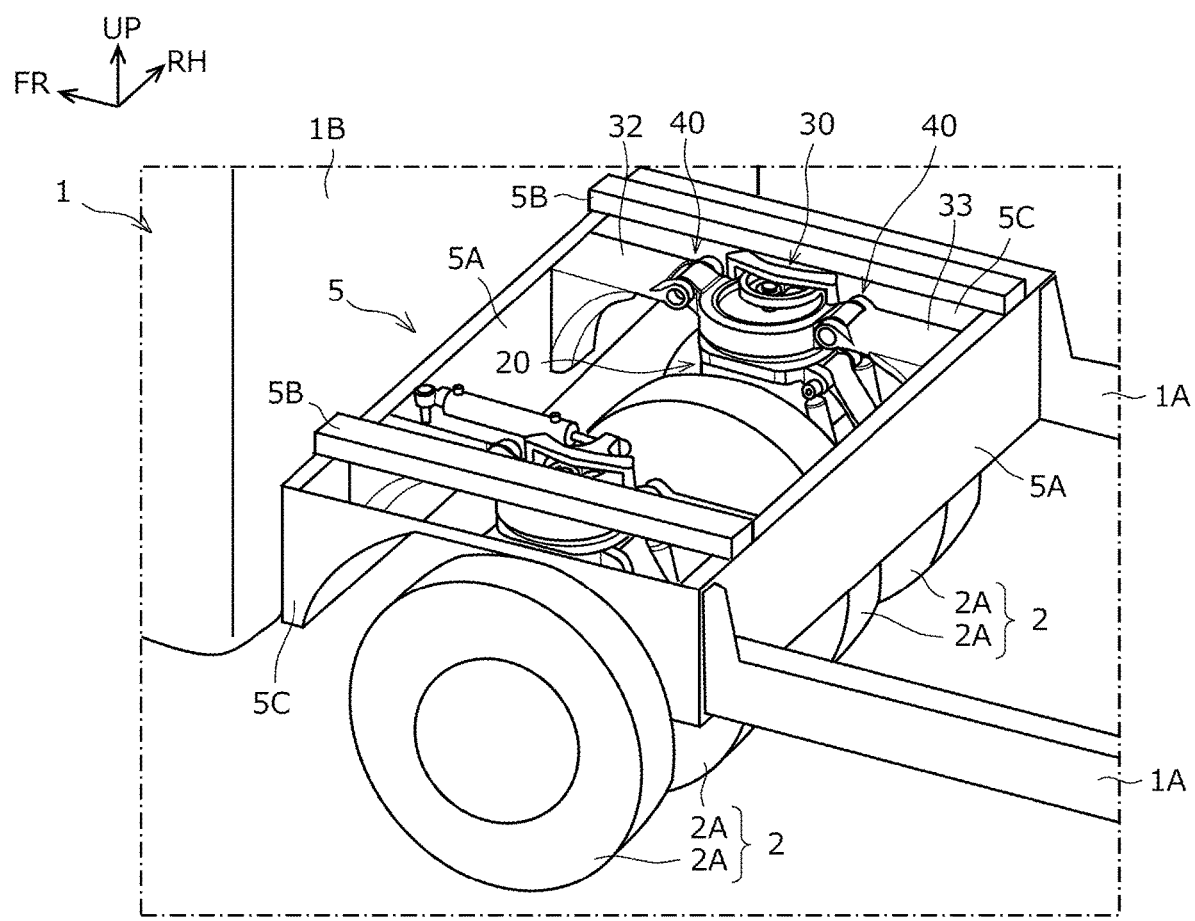
FIG. 2 is a perspective view of the periphery of the drive device arranged on the front side of the electric truck of FIG. 1.

As illustrated in FIG. 1 and FIG. 2, the truck 1 of the present embodiment includes double-tires 2 each consisting of two drive wheels 2A (drive wheels). In the truck 1 of the present embodiment, a pair of left and right double-tires 2 are provided on the front side (front wheel side) of the vehicle, and two pairs of left and right double-tires 2 are provided side by side on the rear side (rear wheel side) of the vehicle, but the number of double-tires 2 in the front-rear direction is not limited to this. Each double-tire 2 is provided with one drive unit 10 including the motor 11, and the drive power of the motor 11 is transmitted to the double-tire 2 (drive wheels 2A). The configuration of the drive unit 10 will be described below.

The truck 1 of the present embodiment includes a body frame casing 5 composed of a pair of mounting frame bodies 5A extending in the vehicle width direction, a pair of cross members 5B and a pair of cross members 5C connecting the mounting frame bodies 5A, and body-connecting parts 32 and 33 for connecting the drive unit 10 disposed in the frame of the body frame casing 5 to the respective mounting frame bodies 5A.

The pair of mounting frame bodies 5A are disposed apart from each other in the front-rear direction. Each of the cross members 5B and 5C connects the front and rear mounting frame bodies 5A. The pair of left and right drive units 10 are disposed in the frame of the body frame casing 5 so as to be adjacent to each other in the vehicle width direction. In the truck 1 of the present embodiment, one body frame casing 5 is provided on the front side (front wheel side) of the vehicle, and two body frame casings 5 are provided on the rear side (rear wheel side) of the vehicle, but the number of body frame casings 5 in front and that in rear are not limited to these. As described above, in the truck 1 of the present embodiment, the body frame casing 5 in which the pair of left and right drive units 10 are connected by the body-connecting parts 32 and 33 constitutes a front axle and a rear axle of the vehicle.

The body frame casing 5 of the present embodiment is formed of a rectangular flat plate member in which the front and rear mounting frame bodies 5A extend in the vehicle width direction and the vertical direction. The cross members 5B located above the body frame casing 5 are each formed of a member having a U-shaped or hat-shaped cross section extending in the front-rear direction, and connects the flanges at the upper ends of the front and rear mounting frame bodies 5A. On the other hand, the cross members 5C located on the sides of the body frame casing 5 are each formed of a flat plate member extending in the front-rear direction and the vertical direction and having a concave portion formed so as to surround the drive wheel 2A. Any one of the cross members 5B and 5C may be omitted.

Figure 3:
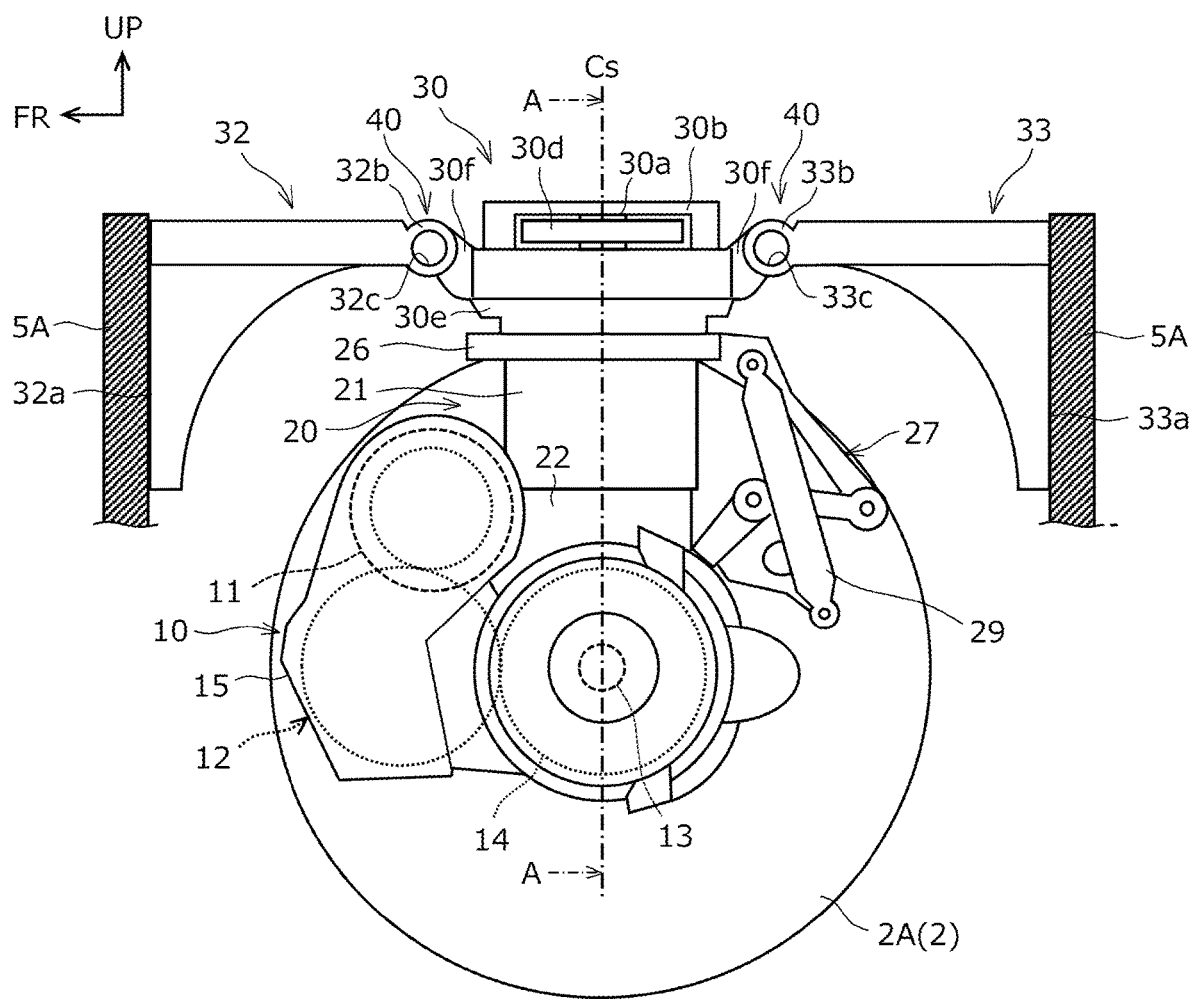
FIG. 3 is a side view of a drive device according to an embodiment, omitting one of the wheels.
Figure 5:
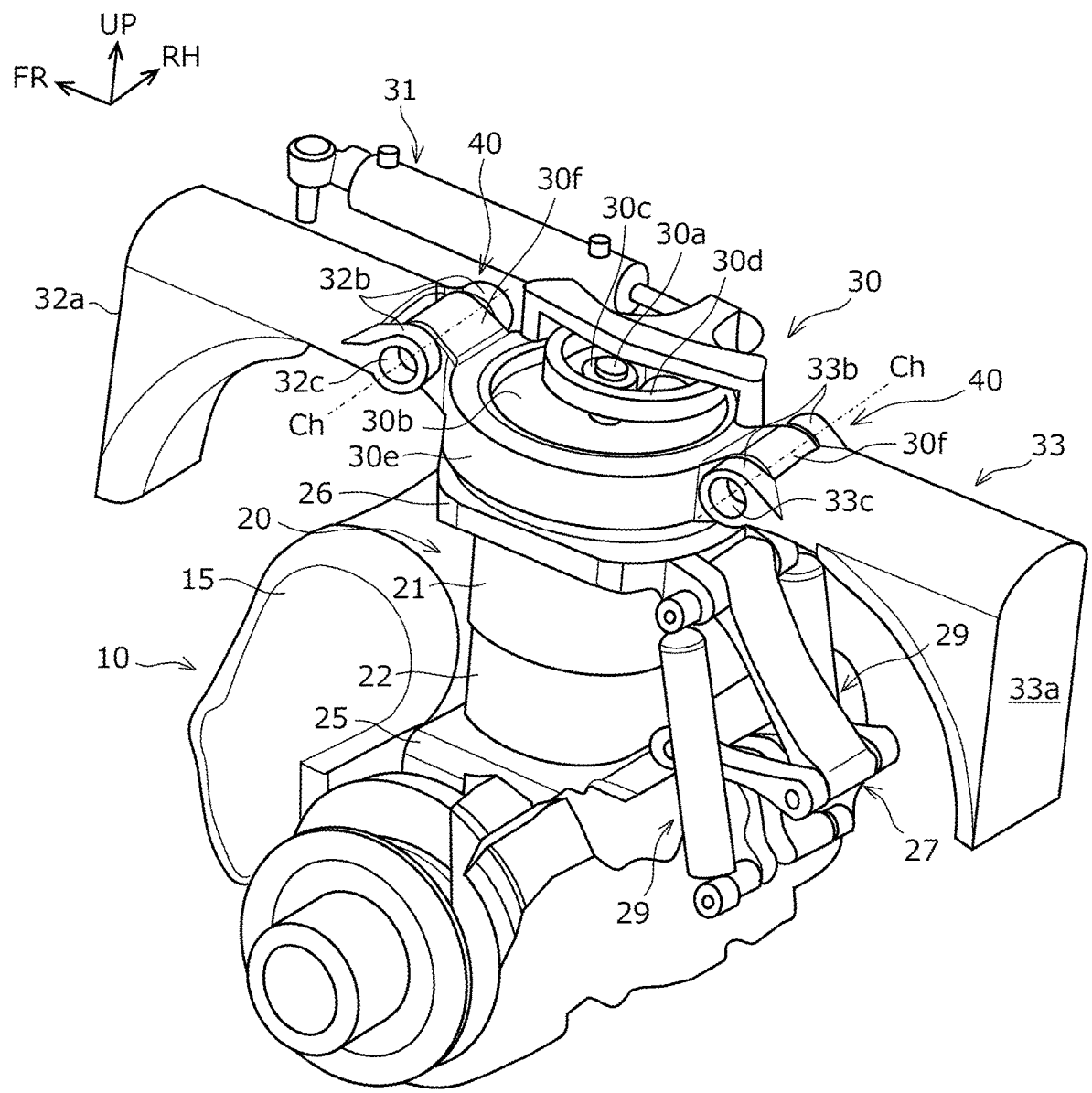
FIG. 5 is a perspective view of a drive device according to an embodiment, omitting a double-tire.

As illustrated in FIG. 2, the front body-connecting part 32 connects the front side of the drive unit 10 in the frame to the front mounting frame body 5A, and the rear body-connecting part 33 connects the rear side of the drive unit 10 in the frame to the rear mounting frame body 5A. As illustrated in FIG. 3 and FIG. 5, the front and rear body-connecting parts 32 and 33 are formed in the same manner (front and rear symmetric). Each of the body-connecting parts 32 and 33 extends in the front-rear direction and is connected to the mounting frame body 5A to constitute a part of the frame of the truck 1.

At the front end portion of the front body-connecting part 32, a planar mounting face 32a extending in a direction orthogonal to the front-rear direction is provided. At the rear end portion of the front body-connecting part 32, a pair of connecting side protruding portions 32b protruding rearward is provided. The mounting face 32a is a part to be attached to the mounting frame body 5A, and has a fastening hole (not shown). The pair of connecting side protruding portions 32b are separated from each other in the vehicle width direction, and have holes 32c penetrating in the vehicle width direction. The connecting side protruding portion 32b constitutes a part of a hinge part 40, which will be described below, and is connected to a steering gear part 30, which will also be described below.

At the rear end portion of the rear body-connecting part 33, a planar mounting face 33a extending in a direction orthogonal to the front-rear direction is provided. At the front end portion of the rear body-connecting part 33, a pair of connecting side protruding portions 33b protruding forward and each having a hole 33c are provided. The configuration of the mounting face 33a and the connecting side protruding portions 33b are the same as the configuration of the mounting face 32a and the connecting side protruding portions 32b, respectively.

Figure 4:
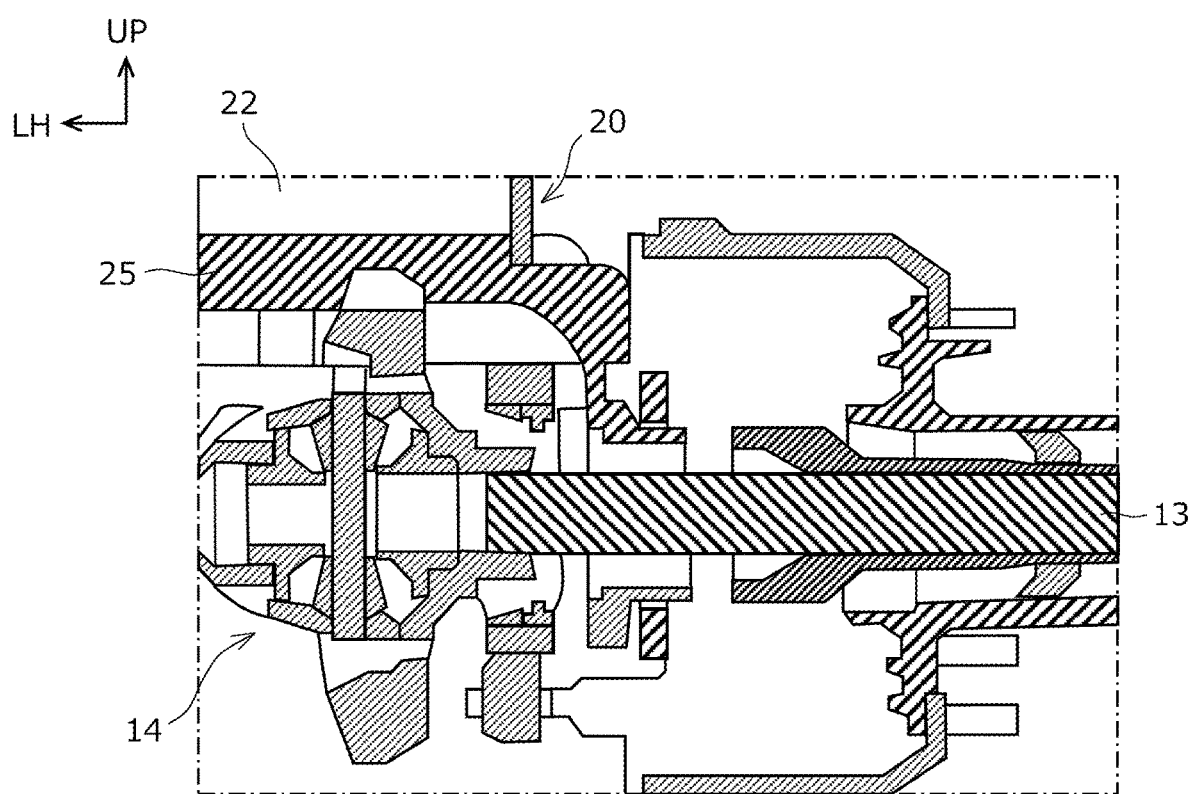
FIG. 4 is a cross-sectional view taken along the A-A arrows of FIG. 3.

As illustrated in FIG. 3 and FIG. 4, the drive unit 10 includes the motor 11 that generates drive power, a reducer 12 that reduces a rotation speed of the motor 11, a final gear 14 that is connected to the reducer 12 and transfers the drive power of the motor 11 to a drive shaft 13 of the double-tire 2, and a drive unit housing 15 that integrally accommodates these units. That is, the drive unit housing 15 integrally houses the motor 11, the reducer 12, and the final gear 14.

The motor 11 functions as an electric motor when the vehicle is driven, and functions as an electric generator when the vehicle is decelerated. The reducer 12 decelerates the rotation speed of the motor 11 to amplify the motor torque (drive power). The drive shaft 13 is extended in the vehicle width direction with the truck 1 traveling straight forward, and is arranged in pairs on the left and right across the final gear 14. The final gear 14 is positioned substantially at the center of the two drive wheels 2A in the vehicle width direction, and distributes the drive power of the motor 11 amplified by the reducer 12 to the two drive wheels 2A. The final gear 14 may be included in a differential gear. However, in the double-tire 2, the differential gear can be omitted because the two drive wheels 2A are closer to each other than the normal left and right wheels.

In addition to the drive units 10 disposed on the left and right sides of the truck 1, the drive device of the truck 1 includes a suspension part 20 provided over the final gear 14 in the drive unit housing 15, and a steering gear part 30 provided over the suspension part 20. Further, the drive device includes the pair of hinge parts 40 provided one on each of the vehicle front side and the vehicle rear side of the steering gear part 30, respectively, and the body-connecting parts 32 and 33 described above.

The suspension part 20 functions as a suspension for absorbing vertical vibration of the double-tire 2. The steering gear part 30 is configured to be able to steer the double-tire 2, and has a function of steering the double-tire 2 around a steering shaft 30a (changing a steering angle). The double-tire 2 may be steered manually or automatically. Each double-tire 2 is individually driven and individually steered. The hinge part 40 has a function of suppressing the vertical vibration of the double-tire 2 from being transmitted to the vehicle body. The body-connecting parts 32 and 33 are for connecting the steering gear part 30 and the vehicle body of the truck 1 through the pair of hinge parts 40. A pair of the front and rear body-connecting parts 32 and 33 are provided across the steering shaft 30a.

In the present embodiment, as illustrated in FIG. 2, both the suspension part 20 and the steering gear part 30 are located above a space between the two drive wheels 2A constituting the double-tire 2. Further, in the drive device shown in FIG. 3, the motor 11 is disposed in front of the final gear 14 and above the reducer 12, but the position of the motor 11 may be set according to the specification and the size of the motor 11, the space in which the motor 11 can be disposed, and the like. For example, the motor 11 may be disposed behind the final gear 14, or may be disposed obliquely above the final gear 14. Alternatively, the output shaft (not shown) of the motor 11 may be disposed in a downward extending posture.

[2. Configuration of Main Parts]

Figure 6:
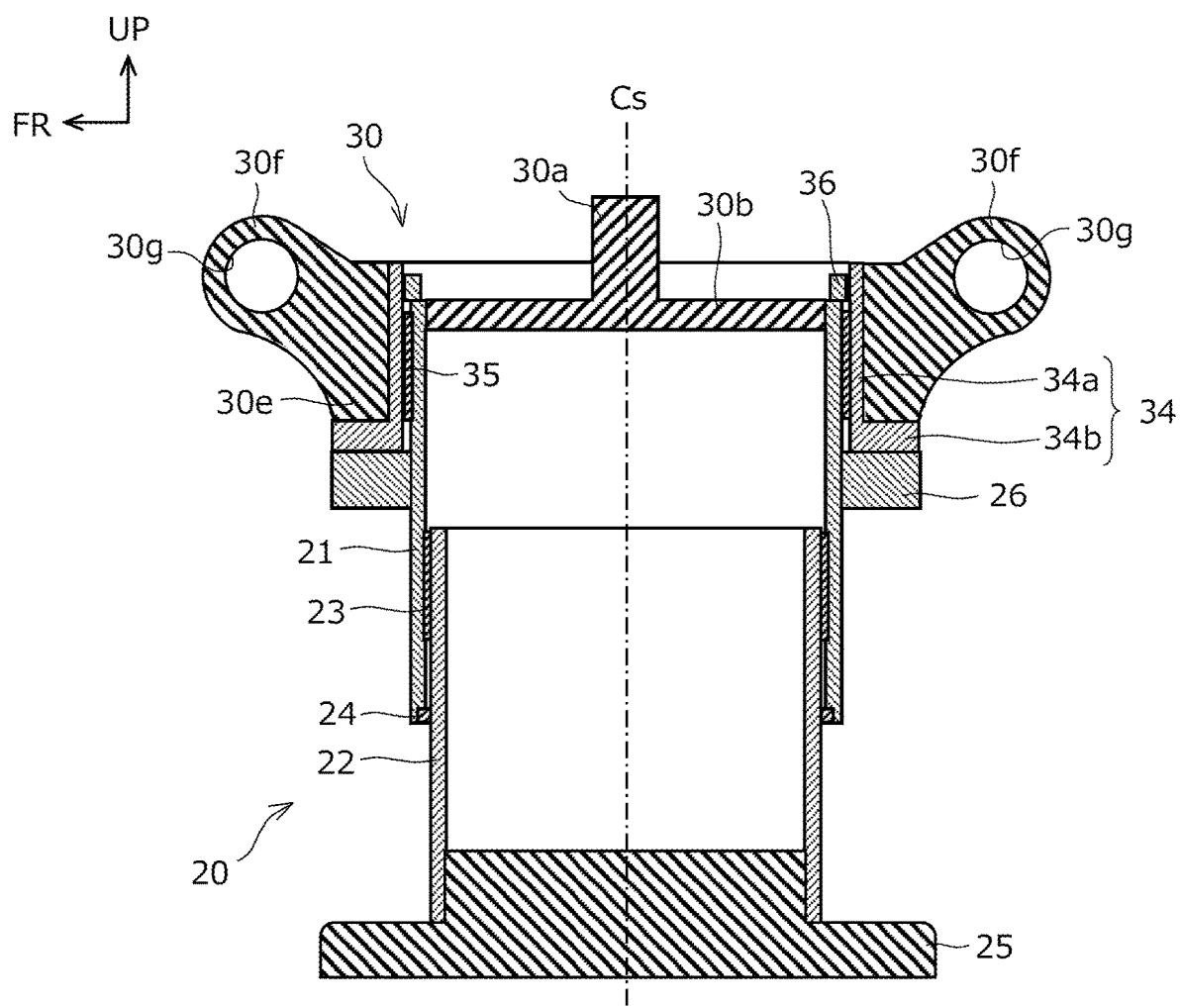
FIG. 6 is a schematic cross-sectional view explaining the main configuration of a drive device.

First, the suspension part 20 will be described in detail. As illustrated in FIG. 5 and FIG. 6, the suspension part 20 of the present embodiment is an air suspension including an outer tube 21 centered at the steering shaft 30a of the double-tire 2, and an inner tube 22 being concentric with the outer tube 21. The inner tube 22 is slidable along an inner circumference face of the outer tube 21 in an axis direction and incapable of relatively rotating with respect to the outer tube 21. The steering shaft 30a is a shaft portion having a steering center Cs when the double-tire 2 is steered, and extends in the vertical direction. The steering center Cs coincides with the centers of the outer tube 21 and the inner tube 22.

Figure 7:
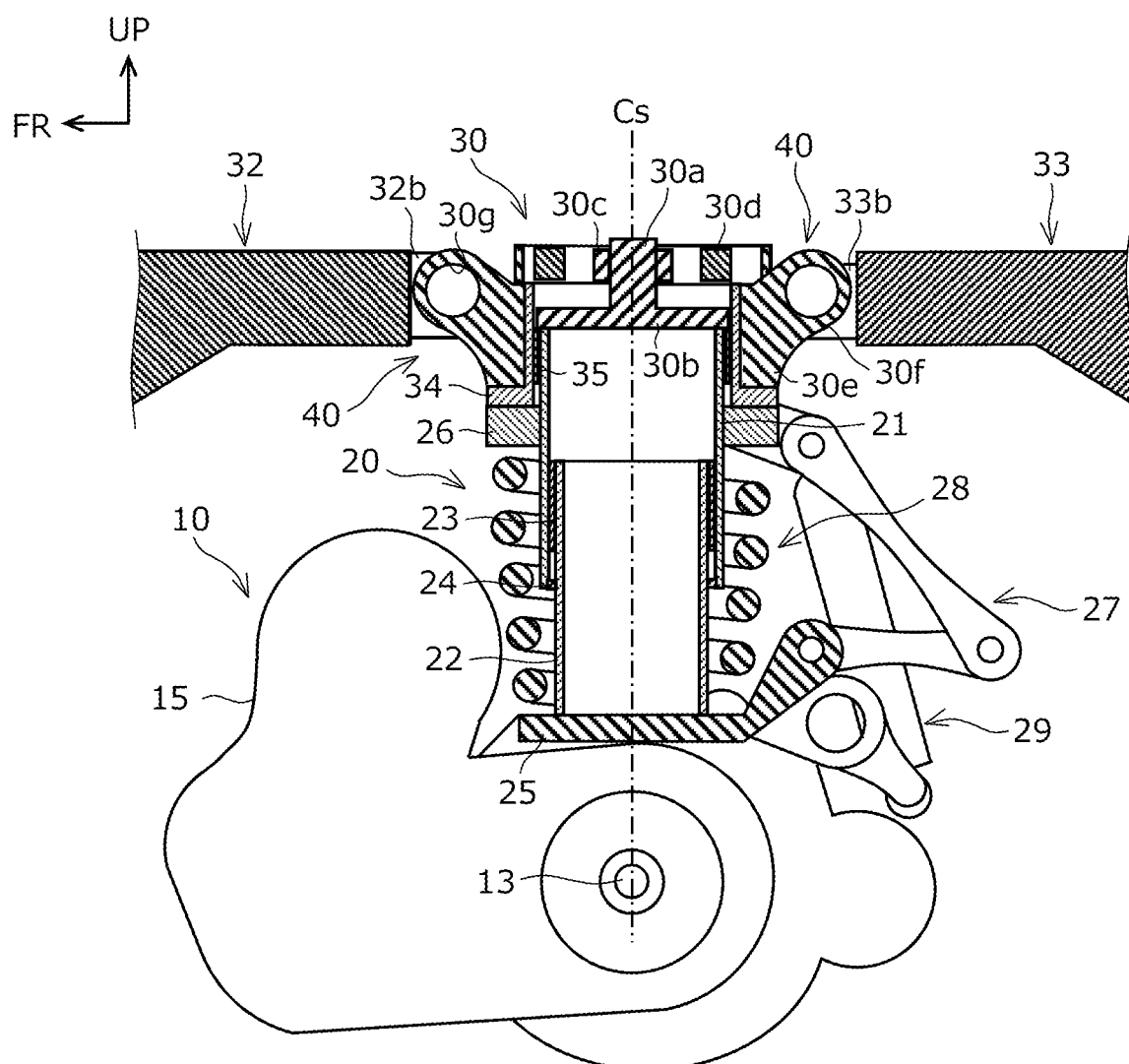
FIG. 7 is a partial cross-sectional view of a drive device as an embodiment, which is cut in a vehicle front-rear direction through a steering center.

As illustrated in FIG. 7, the suspension part 20 may also have a coil spring 28 surrounding the outer tube 21 and the inner tube 22. The suspension part 20 having the coil spring 28 is applied to the relatively lightweight truck 1. On the other hand, the suspension part 20 without the coil spring 28 shown in FIG. 5 and FIG. 6 is applied to the truck 1 which has a relatively large weight because the suspension part 20 has a larger capacity of air than that of the suspension part 20 having the coil spring 28. The suspension part 20 shown in FIG. 7 is basically the same as the suspension part 20 shown in FIG. 5 and FIG. 6 except that the coil spring 28 is provided. Therefore, hereinafter, FIG. 7 will be described with reference to one of the embodiments.

As illustrated in FIG. 5 to FIG. 7, each of the outer tube 21 and the inner tube 22 has a vertically-long cylindrical shape, and the inner diameter of the outer tube 21 is slightly larger than the outer diameter of the inner tube 22. The upper opening of the outer tube 21 is sealed by a cover part 30b to which the steering shaft 30a is fixed, and the lower opening of the outer tube 21 communicates with the inner tube 22 by insertion of the upper portion of the inner tube 22. The upper opening of the inner tube 22 enters the lower portion of the outer tube 21 and communicates with the outer tube 21, the lower opening of the inner tube 22 is sealed with a flat drive head 25. Air is sealed inside the outer tube 21 and the inner tube 22.

As illustrated in FIG. 6, the drive head 25 may have a stepped shape so that the drive head 25 is also fixed to the inner circumference face at the lower end of the inner tube 22. In this case, the fixation between the inner tube 22 and the drive head 25 becomes strong, and it becomes possible to resist a load in the lateral direction. A stopper 24 that prevents the inner tube 22 from coming off and that seals the lower end of the outer tube 21 is fixed to the lower end of the outer tube 21. When the coil spring 28 is provided on the suspension part 20, the coil spring 28 is arranged around the outer tube 21 and the inner tube 22, as illustrated in FIG. 7.

The outer tube 21 and the inner tube 22 are relatively displaced (slide) in the axial direction (vertical direction) according to the vertical vibration of the truck 1 (vertical movement of the double-tire 2). As illustrated in FIG. 6, the suspension part 20 of the present embodiment includes a low frictional member 23 being arranged at a point where the outer tube 21 is brought into slidable contact with the inner tube 22. The low frictional member 23 is a member that reduces sliding friction of the outer tube 21 with inner tube 22, and is attached to, for example, the inner circumference face of the outer tube 21 or the outer circumference face of the inner tube 22. The low frictional member 23 avoids direct contact between the outer tube 21 and the inner tube 22, and reduces the friction when these slide relatively in the vertical direction.

As illustrated in FIG. 5 and FIG. 7, in the present embodiment, an annular attaching part 26 is fixed to the outer circumference face of the upper portion of the outer tube 21, and the attaching part 26 and the drive head 25 are linked by a stabilizer 27 (also referred to as a steering arm). Thereby, the relative rotation of the outer tube 21 and the inner tube 22 is restricted. Further, by linking the upper part of the outer tube 21 and the lower part of the inner tube 22 to each other, relative vertical movement of the outer tube 21 and the inner tube 22 is allowed, and these movements are smoothed.

In the suspension part 20 of the present embodiment, shock absorbers 29 are provided on both left and right sides of the stabilizer 27, respectively. The shock absorber 29 has an upper end connected to the attaching part 26 and a lower end connected to the drive head 25 via mounting components.

Next, the steering gear part 30 will be described in detail. The steering gear part 30 of the present embodiment is configured to be capable of steering the double-tire 2 up to 90° leftward and rightward on an assumption that a steering angle of the double-tire 2 under a state where the truck 1 is traveling straight forward (that is, when the drive shaft 13 extends in the vehicle width direction) is 0° (reference). That is, the double-tire 2 can be steered by 180° by the steering gear part 30, and when the double-tire 2 is steered 90° leftward or rightward from the forward direction, the extending direction of the drive shaft 13 becomes the front-rear direction, and the truck 1 can move in the left-right direction.

As illustrated in FIG. 5 and FIG. 7, the steering gear part 30 includes the steering shaft 30a fixed to the cover part 30b, a spur gear 30c fixed to the steering shaft 30a, an annular gear 30d that meshes with the spur gear 30c, a tube portion 30e concentrically arranged with the steering shaft 30a, and a driving part 31 connected to the annular gear 30d to rotate the annular gear 30d. The driving part 31 is an actuator such as a hydraulic cylinder or a stepping motor.

In the example of FIG. 5, when the driving part 31 rotates the annular gear 30d clockwise in a top view, the spur gear 30c also rotates clockwise. Accordingly, since the steering shaft 30a also rotates clockwise, the double-tire 2 is steered rightward. Conversely, when the driving part 31 rotates the annular gear 30d counterclockwise, the spur gear 30c also rotates counterclockwise. Accordingly, since the steering shaft 30a also rotates counterclockwise, the double-tire 2 is steered leftward. As illustrated in FIG. 3, the steering shaft 30a is disposed equidistant from each of the pair of mounting frame bodies 5A.

As illustrated in FIG. 5 to FIG. 7, a pair of front and rear protruding portions 30f are formed on the tube portion 30e and connected to the connecting side protruding portions 32b and 33b of the body-connecting parts 32 and 33, respectively. The protruding portion 30f protrudes in the front-rear direction from each of the outer circumference face on the front side and the outer circumference face on the rear side of the tube portion 30e, and forms the hinge part 40 together with the above-mentioned connecting side protruding portions 32b and 33b. That is, the front protruding portion 30f is interposed between the pair of connecting side protruding portions 32b, and a portion functioning as a rotating center Ch of the hinge parts 40 is inserted into the hole 32c of each connecting side protruding portion 32b. In the protruding portions 30f of the present embodiment, a cylindrical portion (not shown) having a through hole 30g penetrating in the vehicle width direction is inserted into the hole 32c.

Similarly, the rear protruding portion 30f is interposed between the pair of connecting side protruding portions 33b, and a cylindrical portion functioning as the rotating center Ch of the hinge part 40 is inserted into the hole 33c of each connecting side protruding portion 33b. A bush (not shown) that absorbs a load to be transmitted to the vehicle body is interposed in the hinge parts 40 of the present embodiment. With the bush interposed, the load to be transmitted to the vehicle body is absorbed, and the drive feeling is further improved.

As illustrated in FIG. 6 and FIG. 7, in the tube portion 30e, the cover part 30b and the upper portion of the outer tube 21 are concentrically arranged and rotatably supported with respect to the tube portion 30e. That is, the outer tube 21, the inner tube 22, the cover part 30b, and the drive head 25 rotate integrally about the steering shaft 30a with respect to the tube portion 30e. A thrust plate 34 that receives a vertical load is interposed between the inner circumference face of the tube portion 30e and the outer circumference face of the outer tube 21. At the upper end of the thrust plate 34, a stopper 36 for preventing the outer tube 21 from coming off is fixed.

The thrust plate 34 of the present embodiment includes a cylinder portion 34a located between the tube portion 30e and the outer tube 21, and a flange portion 34b projecting radially outward from a lower end of the cylinder portion 34a. The flange portion 34b is sandwiched between the upper surface of the attaching part 26 and the lower surface of the tube portion 30e. The thrust plate 34 is a metal component that is not fixed to any component and functions as a spacer, and avoids direct contact between the tube portion 30e on the fixed side and the outer tube 21 and the attaching part 26 on the rotating side. The thrust plate 34 is made replaceable due to wear.

The steering gear part 30 of the present embodiment includes a low frictional member 35 arranged at a point where the outer tube 21 is brought into slidable contact with the thrust plate 34. The low frictional member 35 is a member that reduces friction between the outer tube 21 and the thrust plate 34, and is attached to, for example, the outer circumference face of the outer tube 21 or the inner circumference face of the thrust plate 34. The friction at the time of relative displacement between the outer tube 21 and the thrust plate 34 is reduced by the low frictional member 35.

[3. Actions and Effects]

According to the drive device for the above truck 1, it is possible to obtain the following actions and effects.

(1) The drive unit 10 including a drive unit housing 15 integrally accommodating the motor 11, the reducer 12, and the final gear 14 is provided for each drive wheel 2A disposed on each of the left and right sides of the truck 1, and the suspension part 20 and the steering gear part 30 are provided above the final gear 14. This drive device drives each individual drive wheel 2A and steers each individual drive wheel 2A, and consequently can achieve a steering angle in the range of 0° to 180°, which makes the turning radius small. Furthermore, the steering gear part 30 is coupled to the vehicle body via the part of hinge parts 40 and the body-connecting parts 32 and 33. The hinge parts 40, which have a function to suppress propagation of vertical vibration of the drive wheel 2A to the vehicle body, can suppress the vehicle vibration as well as the suspension part 20, so that drive feeling can be improved. Accordingly, it is possible to provide the drive device for the truck 1 having a steering performance of 0° to 180° in steering angle while improving the drive feeling.

(2) In the drive device described above, the suspension part 20 is an air suspension including: the outer tube 21 centered at the steering shaft 30*a* of the drive wheel 2A; and the inner tube 22 being slidable along the inner circumference face of the outer tube 21 in the axis direction and being incapable of relatively rotating with respect to the outer tube 21. As such, the air suspension serving as the suspension part 20 can have a simpler configuration as compared with a hydraulic suspension and an electromagnetic suspension.

(3) According to the drive device described above, since the upper part of the outer tube 21 and the lower part of the inner tube 22 are linked to each other, relative vertical movement can be allowed under a state where the relative rotation of the outer tube 21 and the inner tube 22 is restricted. Further, the axial movement of the outer tube 21 and the inner tube 22 can be smoothed.

(4) In the drive device described above, since the thrust plate 34 interposed between the tube portion 30*e* and the outer tube 21 functions as a spacer, direct contact between the tube portion 30*e* on the fixed side and the outer tube 21 and the attaching part 26 on the rotating side can be avoided. Further, since the thrust plate 34 receives a load of the vertical direction, the drive feeling can be further improved.

(5) In particular, since the steering gear part 30 described above includes a low frictional member 35 disposed at a sliding position between the outer tube 21 and the thrust plate 34, friction at the time of relative displacement between the outer tube 21 and the thrust plate 34 can be reduced. Therefore, the steering performance can be further improved.

(6) According to the drive device described above, since the steering gear part 30 is configured to be capable of steering the drive wheel 2A up to 90° leftward and rightward from reference (that is, up to 180°), the steering performance can be enhanced and mobile parking in the left-right direction is also possible, for example.

(7) The above-described drive device can be applied also to an electric truck 1 adopting the double-tires 2 and being larger in size, and facilitates to balance the arrangement of the suspension part 20 and the steering gear part 30.

(8) By providing the differential gear including the final gear 14, the drive power can be appropriately distributed to the double-tire 2, and the steering performance can be improved.

(9) According to the drive device of the present embodiment, since the suspension part 20 and the steering gear part 30 are disposed over a space between two drive wheels 2A constituting the double-tire 2, the weight balance is good, so that the steering performance of the double-tire 2 can be enhanced.

(10) As illustrated in FIG. 7, since the suspension part 20 also has the coil spring 28, it is possible to configure the suspension part 20 appropriate for the gross weight of the vehicle.

(11) In the drive device of the present embodiment, the suspension part 20 includes a low frictional member 23 disposed at a sliding position between the outer tube 21 and the inner tube 22. For this reason, the friction when the outer tube 21 and the inner tube 22 relatively slide can be reduced, and the performance of the air suspension can be improved.

Figure 8:
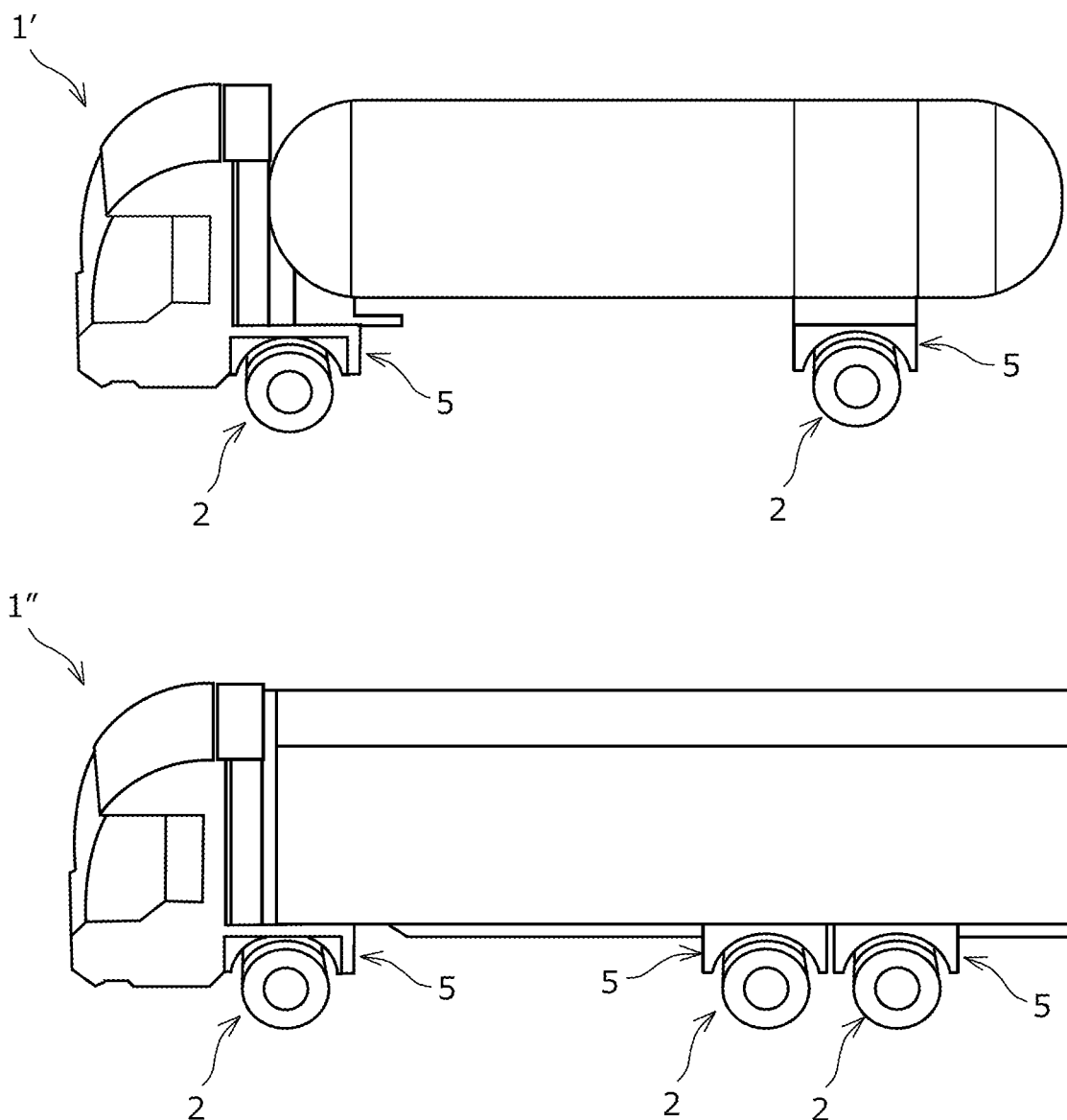
FIG. 8 shows examples in which a common drive device is applied to electric trucks having different specifications.

(12) In the truck 1 of the present embodiment, the drive device is packaged by arranging the pair of drive units 10 to be adjacent to each other in the frame of the body frame casing 5 and connecting the drive units 10 to the body frame casing 5 via the body-connecting parts 32 and 33. That is, the body frame casing 5 to which the pair of left and right drive units 10 are connected by the body-connecting parts 32 and 33 forms a front axle and a rear axle of the vehicle. Therefore, for example, as illustrated in FIG. 8, a common drive device can be applied to the electric trucks 1' and 1" having different gross weight of the vehicle, cargo type, wheelbase, and the like. In other words, since it is not necessary to manufacture a drive device for each of electric trucks having different specifications, manufacturing costs can be reduced. Further, the adjustment of the wheelbase can be made on the customer side, and the commercial value can be enhanced. The electric truck 1' in FIG. 8 is one having a single-axle on the front wheel side and a single-axle also on the rear wheel side, and the electric truck 1" in FIG. 8 is a single-axle truck on the front wheel side and a dual-axle truck on the rear wheel side. By using the above-described drive device, an appropriate number of axels can be arranged on the front wheel side and the rear wheel side.

(13) In particular, in the present embodiment, the steering shaft 30*a* is disposed equidistant from each of the pair of mounting frame bodies 5A. That is, the double-tire 2 is steered at the center in the front-rear direction within the frame of the body frame casing 5, so that the arrangement balance can be improved.

[4. Modification]

The above-described drive device and the truck 1 are all examples. For example, although the suspension part 20 is an air suspension including the outer tube 21 and the inner tube 22, or a hybrid of an air suspension and the coil spring 28, the suspension part can be selected based on the load and application. Alternatively, a hydraulic suspension or an electromagnetic suspension may be employed.

The low frictional members 23 and 35 and the thrust plate 34 are not essential and can be omitted. The structure for restricting the relative rotation between the outer tube 21 and the inner tube 22 is not limited to the link connection by the stabilizer 27. The steering gear part 30 may be realized using gears other than the spur gear 30*c* and the annular gear 30*d*. The range of the steering angle of the double-tire 2 may be set according to the required turning radius.

In the above-described truck 1, although the drive device is packaged by arranging the pair of drive units 10 adjacent to each other in the vehicle width direction in the frame of the body frame casing 5, the method of mounting the drive device on the vehicle body is not limited to this. For example, the drive device may be connected to a pair of left and right chassis frames extending in the front-rear direction. Note that the hinge parts 40 are not essential and may be omitted. The above-described truck 1 has double-tires 2, but may alternatively have a single-tire structure. In this alternative, the drive unit housing 15, the suspension part 20, and the steering gear part 30 may be arranged for each drive wheels, considering a weight balance.

DESCRIPTION OF REFERENCE NUMBERS 1, 1', 1": truck (electric truck)
2: double-tire
2A: drive wheel
11: motor
12: reducer
14: final gear
15: drive unit housing
20: suspension part
21: outer tube
22: inner tube
30: steering gear part
30a: steering shaft
30e: tube portion
30f: protruding portion
32: front body-connecting part
33: rear body-connecting part
34: thrust plate
35: low frictional member
40: hinge part

The invention claimed is:

1. A drive device for an electric truck, the drive device comprising:
    drive unit housings provided to each of drive wheels on left and right sides of the electric truck, each of the drive unit housings integrally accommodating a motor that generates drive power, a reducer that reduces a rotation speed of the motor, and a final gear that is connected to the reducer and transfers the drive power of the motor to the drive wheel;
    suspension parts one provided over the final gear in each of the drive unit housings;
    steering gear parts one being provided over each of the suspension parts and being configured to be steerable the drive wheel;
    pairs of hinge parts, each pair disposed one to each of a vehicle front side and a vehicle rear side of each of the steering gear parts; and
    pairs of body-connecting parts, one of the pairs connecting each of the steering gear parts to a vehicle body of the electric truck through each of the pairs of hinge parts;
    wherein each of the suspension parts is an air suspension comprising: an outer tube centered at a steering shaft of the drive wheel; and an inner tube being concentric with the outer tube, being slidable along an inner circumference face of the outer tube in an axis direction, and being incapable of relatively rotating with respect to the outer tube.

2. The drive device for the electric truck according to claim 1, wherein an upper part of the outer tube is linked to a lower part of the inner tube.

3. The drive device for the electric truck according to claim 1, wherein:
    each of the steering gear parts comprises a protrusion portion to be connected to the body-connecting parts and a tube portion being concentric with the steering shaft of the drive wheel;
    an upper portion of the outer tube is concentric with the tube portion and is rotatably supported by the tube portion inside the tube portion; and
    a thrust plate that receives load of a vertical direction is interposed between an inner circumference face of the tube portion and an outer circumference face of the outer tube.

4. The drive device for the electric truck according to claim 3, wherein the steering gear part further comprises a low frictional member being arranged at a point where the outer tube is brought into slidable contact with the thrust plate and reducing friction of the outer tube with the thrust plate.

5. The drive device for the electric truck according to claim 1, wherein each of the steering gear parts is configured to be capable of steering the drive wheel up to 90° leftward and rightward on an assumption that a steering angle of the drive wheel under a state where the electric truck is traveling straight forward is 0°.

6. The drive device for the electric truck according to claim 1, wherein:
    the drive device is applied to the electric truck comprising a double-tire constituting two of the drive wheels; and
    the drive power of the motor is transferred to the double-tire.

7. The drive device for the electric truck according to claim 6, wherein the final gear of the each of the drive unit housings is included in a differential gear.

* * * * *